(12) United States Patent
Puigardeu Aramendia et al.

(10) Patent No.: US 9,591,185 B2
(45) Date of Patent: Mar. 7, 2017

(54) PROCESSING AN IMAGE INTO SUB-IMAGES MAPPED INTO MULTI-LAYER PRINT MASK DATA

(71) Applicants: Hewlett-Packard Development Company, L.P., Houston, TX (US); Sergio Puigardeu Aramendia, Barcelona (ES); Angel Martinez Barambio, Barcelona (ES); Luis Garcia Garcia, Les Roquetes (ES); M. Isabel Borrel Bayona, Barcelona (ES)

(72) Inventors: Sergio Puigardeu Aramendia, Barcelona (ES); Angel Martinez Barambio, Barcelona (ES); Luis Garcia Garcia, Les Roquetes (ES); M. Isabel Borrel Bayona, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/763,508

(22) PCT Filed: Jan. 29, 2013

(86) PCT No.: PCT/EP2013/051681
§ 371 (c)(1),
(2) Date: Jul. 25, 2015

(87) PCT Pub. No.: WO2014/117815
PCT Pub. Date: Aug. 7, 2014

(65) Prior Publication Data
US 2015/0352871 A1    Dec. 10, 2015

(51) Int. Cl.
*H04N 1/409*    (2006.01)
*H04N 1/23*    (2006.01)
(Continued)

(52) U.S. Cl.
CPC ............. *H04N 1/58* (2013.01); *G06K 15/105* (2013.01); *G06K 15/1857* (2013.01); *H04N 1/4092* (2013.01); *H04N 1/233* (2013.01)

(58) Field of Classification Search
None
See application file for complete search history.

(56) References Cited

U.S. PATENT DOCUMENTS 5,745,145 A  *  4/1998  Hirabayashi ........... B41J 2/2056
                                                         347/15
5,940,585 A       8/1999  Vondran, Jr. et al.
(Continued)

FOREIGN PATENT DOCUMENTS

EP    EP2141905 A1    1/2010
JP    2006309608       11/2006

OTHER PUBLICATIONS

Feng, Jiandiao, et al. "A new edge enhancement on halftone image." In Electric Information and Control Engineering (ICEICE), 2011 International Conference on, pp. 1047-1050. IEEE, 2011.
(Continued)

*Primary Examiner* — Scott A Rogers
(74) *Attorney, Agent, or Firm* — HP Inc. Patent Department

(57) ABSTRACT

A printer and a method of processing an image (1) to be printed with a printer which has a printing unit arranged to produce a printout from image-representing print data of the image, and a processing unit for processing image-representing input data of the image so as to generate the image-representing print data. The processing unit is arranged for separating the image into a line detail sub-image (20) containing edge and line details, and an area detail sub-image (25) containing area details, performing a first printing mode processing pipeline on the line detail sub-image and performing a second, different printing mode (Continued)

processing pipeline on the area detail sub-image, and generating multi-layer print mask data, wherein at least one print mask data layer is usable to print the line detail sub-image in at least one line detail print pass, and the remaining, i.e. at least one of the print mask data layers being used to print the area detail sub-image in at least one area detail print pass to produce an image (50) which has optimized image quality.

12 Claims, 4 Drawing Sheets

(51) Int. Cl.
*G06K 15/02* (2006.01)
*G06K 15/10* (2006.01)
*H04N 1/58* (2006.01)

(56) References Cited

U.S. PATENT DOCUMENTS

| | | | | |
|---|---|---|---|---|
| 5,992,962 A * | 11/1999 | Yen | B41J 2/2132 | 347/12 |
| 5,995,715 A * | 11/1999 | Berche | G06K 15/107 | 347/41 |
| 6,115,134 A * | 9/2000 | Creel | G06K 15/02 | 358/1.16 |
| 6,164,756 A * | 12/2000 | Takahashi | B41J 2/2132 | 347/14 |
| 6,178,011 B1 | 1/2001 | Lin et al. | | |
| 6,454,389 B1 * | 9/2002 | Couwenhoven | G06K 15/107 | 347/14 |
| 6,536,869 B1 * | 3/2003 | Bland | B41J 2/2132 | 347/12 |
| 6,874,864 B1 * | 4/2005 | Maeda | G06K 15/105 | 347/16 |
| 6,965,452 B2 * | 11/2005 | Garcia | G06K 15/107 | 358/1.9 |
| 8,467,114 B2 * | 6/2013 | Yakubov | B41J 2/2132 | 347/100 |
| 9,327,535 B2 * | 5/2016 | Fernandez | G06K 15/105 | |
| 2003/0202215 A1 * | 10/2003 | Biddle | G06K 15/107 | 358/3.26 |
| 2004/0042047 A1 * | 3/2004 | Kawatoko | B41J 2/205 | 358/3.06 |
| 2005/0168770 A1 * | 8/2005 | Kurose | G06F 3/1212 | 358/1.15 |
| 2006/0239454 A1 | 10/2006 | Kwon | | |
| 2007/0008561 A1 * | 1/2007 | Kanda | G06F 3/1212 | 358/1.9 |
| 2008/0309952 A9 * | 12/2008 | Billow | G06K 15/107 | 358/1.8 |
| 2009/0074289 A1 | 3/2009 | Washio | | |
| 2010/0321743 A1 * | 12/2010 | Miyazaki | H04N 1/1915 | 358/474 |
| 2011/0084999 A1 * | 4/2011 | Kyoshima | B41J 2/2125 | 347/14 |
| 2011/0292104 A1 * | 12/2011 | Rodriguez Alonso | B41J 2/2132 | 347/9 |
| 2012/0013665 A1 * | 1/2012 | Vall | B41J 2/2132 | 347/15 |
| 2012/0044526 A1 * | 2/2012 | Miyazaki | B41J 2/2132 | 358/1.15 |
| 2012/0159292 A1 | 6/2012 | Leynadier et al. | | |
| 2012/0194594 A1 * | 8/2012 | Fujimoto | B41J 2/2132 | 347/15 |
| 2013/0250364 A1 * | 9/2013 | Nakagawa | B41J 2/2132 | 358/3.13 |
| 2014/0063105 A1 * | 3/2014 | Couwenhoven | H04N 1/6016 | 347/15 |
| 2014/0152727 A1 * | 6/2014 | Vall | B41J 11/008 | 347/12 |

OTHER PUBLICATIONS

International Search Report, European Patent Office, Apr. 23, 2013, PCT Patent Application No. PCT/EP2013/051681, 4 pages.

* cited by examiner 1 1 1 1 1 1 1 1 ...
1 1 1 1 1 1 1 1 ...
1 1 1 1 1 1 1 1 ...
. . . . . . . . . . . . . . . . . .

a)     Level 1 matrix used to print sub-image with lines and edges

2384652347...
8726435784...
7456823465...
3672856378...
. . . . . . . . . . . . . . . .

b) Level 2 matrix used to print sub-image with area fills

5787376823...
4786872348...
8647827343...
2856238742...
. . . . . . . . . . . . . . . .

c) Level 3 matrix used to print sub-image with area fills

Fig. 2

PROCESSING AN IMAGE INTO SUB-IMAGES MAPPED INTO MULTI-LAYER PRINT MASK DATA

CROSS-REFERENCE TO RELATED APPLICATION

This application is a U.S. National Stage Application of and claims priority to International Patent Application No. PCT/EP2013/051681, filed on Jan. 29, 2013, and entitled "PRINTER AND METHOD OF PROCESSING AN IMAGE TO BE PRINTED," which is hereby incorporated by reference in its entirety.

In the field of printers, a customer complaint on image quality in any printing device often is that it is not possible to get the best possible image quality both in lines and area fills at the same time in a single printmode. Up to date there has not been a solution for this limitation. This is because in order to optimize lines specific printing pipelines to enhance line sharpness are needed, which, however, have a side effect when printing area fills and renders as they provoke undesired artifacts in color transitions and gradients. Likewise, if a printing pipeline is optimized for area fills and renders, e.g. to minimize banding, improve color transitions, etc., lines and text sharpness often will not meet customer expectations.

BRIEF DESCRIPTION OF THE DRAWINGS

Examples of the invention will now be described, by way of example only, with reference to the accompanying drawings in which corresponding reference numerals indicate corresponding items, and in which:

FIG. 2a)-c) show schematic representations of print mask data as they can be used according to an example;

DETAILED DESCRIPTION OF EXAMPLES

Figure 4:
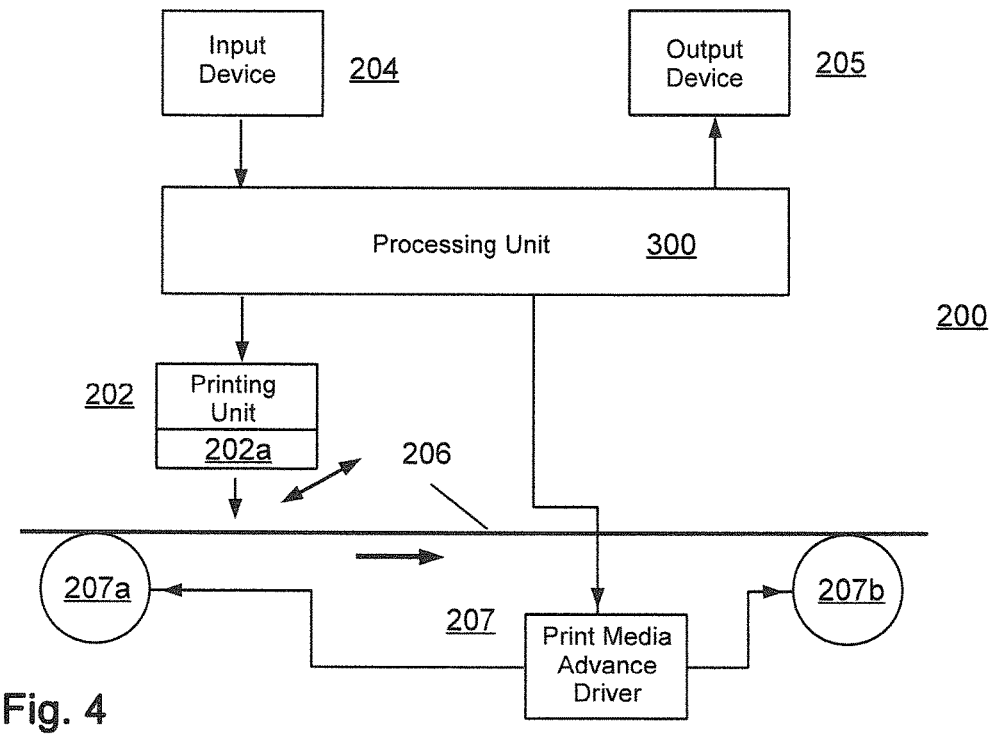
FIG. 4 is a schematic diagram of a printer which comprises a printing unit arranged to produce a printout from image-representing data of an image to be printed and which is arranged for processing an image to be printed according to an example.

FIG. 4 illustrates a simplified schematic diagram of a printer which includes a printing unit 202 arranged to produce a printout from image-representing print data of an image to be printed on a print media 206, and a processing unit 300 for processing image-representing input data of the image so as to generate said image-representing print data. The image-representing print data are forwarded from the processing unit 300 to the printing unit 202 in correspondence with a print job to be carried out by the printer. In the present example, the printer 200 is an inkjet printer, so that the printing unit 202 is an inkjet printing unit. The printer also may be another type of printer, as a liquid electrophotographic printer (LEP). The printer may be a wide format printer.

The print media 206 which may be of any suitable kind as known in the art is transported relative to the printing unit 202 by a print media advance system, which is exemplified in FIG. 4 by a print media advance driver 207 and print media advance rolls 207a and 207b. It is noted that the print media advance system schematically shown in FIG. 4 is for illustrative purposes only and can be embodied in any suitable way. The print media advance driver 207 is coupled to the processing unit 300 so as to receive appropriate print media advance driving signals in correspondence with the print job to be carried out by the printer.

The printing unit 202 of the printer 200, in the example illustrated, includes a printing system 202a which may be a printing carriage arranged for moving in a reciprocating type of movement across the width of the print media 206. The direction of this reciprocating movement across the print media 206 is usually called the main scanning direction or swath direction, the movement is often simply called swathing, and it is in a direction perpendicular to the drawing plane of FIG. 4 as indicated by the double-ended arrow. The printing carriage 202a may typically include one or more print-heads arranged for printing on the print media 206.

Alternatively, the printer 200 may be a so-called Page Wide Array (PWA) printer wherein the printing unit 202 includes a printing system 202a which is arranged for printing across the whole width of the print media 206. In such a PWA printer the carriage is substituted by an array of printheads that covers the whole width of the print media. In this way, the print media 206 moves forward in, generally, a constant movement while ink drops are fired on it. Here, it is the extension of the PWA printing system 202a, across the whole width of the print media 206, which is in the direction perpendicular to the drawing plane of FIG. 4 as indicated by the double-ended arrow.

The printer as exemplified in FIG. 4 further includes an input device 204, which is arranged to receive printer-operation-related input from a user, and also an output device 205, which is arranged to provide printer-operation-related information for the user. The input device 204 and the output device 205 are coupled to the processing unit 300 so that corresponding input and output signals can be communicated between the processing unit 300 and the input device 204 and the output device 205, respectively. The input device 204 may be of any suitable type, e.g. it may be an input panel including a number of keys for direct manual input from the user, or it may be an interface which is coupled to a data processing environment or network. In a similar way, the output device 205 may be any suitable kind of output device, e.g. it may be a display for the direct outputting of information to the user, or it may be an interface which is coupled to a data processing environment or network, as may be the case for the input device 204.

Figure 4A:
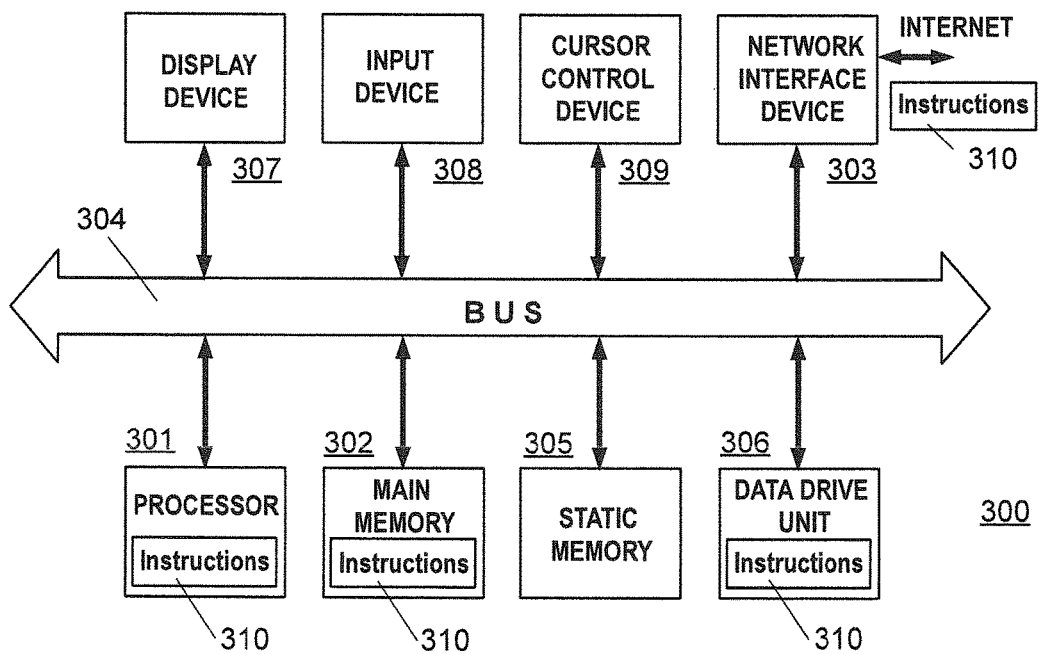
FIG. 4a is a diagrammatic representation of a computer system as it may be arranged to provide the functionality of a processing unit implemented in the printer.

Further, FIG. 4a is a diagrammatic representation of a computer system as it may be arranged, by way of example, to provide the functionality of the processing unit 300 of the printer in FIG. 4. The computer system is configured to execute a set of instructions so that the processing unit 300 is able to perform the described tasks for the printer. The computer system as exemplified includes a processor 301 and a main memory 302, which communicate with each other via a bus 304. Optionally, the computer system may include a static memory 305 and/or a non-transitory memory in the form of a data drive unit 306 which may be e.g. a solid-state memory or a magnetic or optical disk-drive unit. A video display 307, which may be part of the computer system, may form the output device 205 of FIG. 4, and an alphanumeric input device 308 and/or a cursor-control device 309 may form the user-input device 204 of FIG. 1. Additionally, a network interface device 303 may be provided to connect the computer system to an Intranet or to the Internet which form the above mentioned data processing environment or network.

A set of instructions (i.e. software) 310 embodying any one or all of the tasks to be performed by the processing unit 300, may reside completely, or at least partially, in or on a machine-readable medium, e.g. the main memory 302 and/or the processor 301. A machine-readable medium on which the software 310 resides may also be a data carrier, e.g. a solid-state memory or a data drive, a non-removable magnetic hard disk or an optical or magnetic removable disk which is part of the data drive unit 306. The software 310 may also be transmitted or received as a propagated signal via the Intranet or the Internet through the network interface device 303, which can also be used for updating the software or for other purposes.

Referring back to FIG. 4, as already stated above, the printer processing unit 300 is arranged to forward the image-representing print data to the printing unit 202 in correspondence with the print job to be carried out, wherein a number of parameters involved in the print job can be set by the user as a part of the printer-operation-related input. A representation of these parameters, or at least a part thereof, may be provided to the user by the output device 205 in the form of printer-operation-related information.

Figure 1:
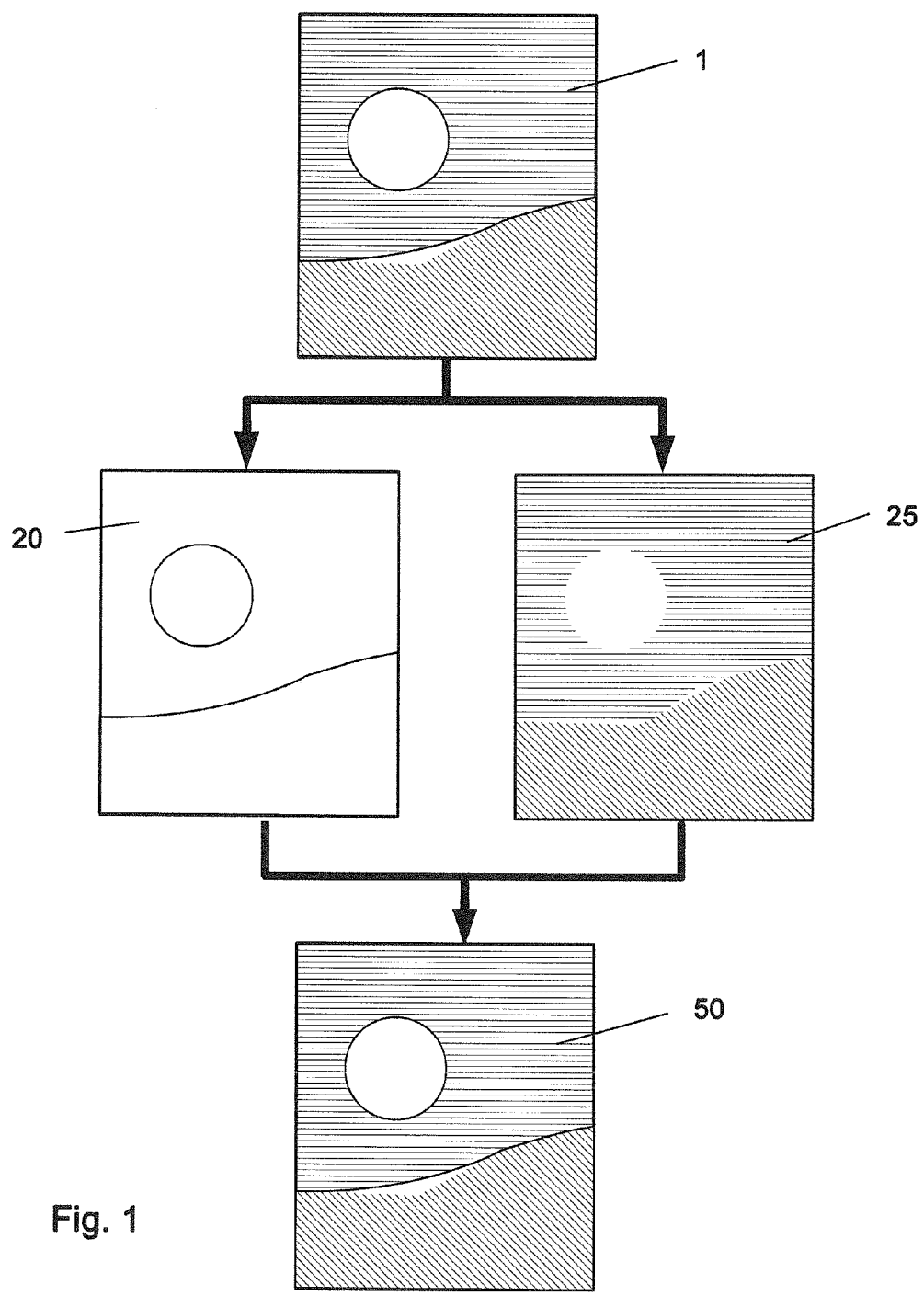
FIG. 1 shows a schematic diagram of an image as processed according to an example.

Now referring to FIG. 1, a schematic diagram is shown of an image as processed according to an example. Reference numeral 1 denotes, in a simplified, schematic manner, an image to be printed by the printing unit 300 of the printer 200 as exemplified in FIG. 4. The image 1 may be input to the printing unit 300 in the form of appropriate image-representing input data, e.g. in the form of RGB or CMYK data or in the form of other appropriate data as known in the art. The processing unit 300 is arranged for processing the image to be printed on the basis of the image-representing input data and for generating image-representing print data which are used by the printing unit 202 to produce the printout of the image.

The processing unit 300 is arranged to separate the image 1 into a line detail sub-image 20 containing edge and line details or at least one of edge and line details, and into an area detail sub-image 25 containing area details, also referred to as area fills.

As shown in FIG. 1, the line detail sub-image 20 and the area detail sub-image 25 finally, during printout of the image, are printed in at least one line detail print pass and at least one area detail print pass to produce an image 50 which has optimized image quality.

In general, the processing unit 300 performs a first printing mode processing pipeline on the line detail sub-image 20, and a second, different printing mode processing pipeline on the area detail sub-image 25.

A printing mode processing pipeline, in general, performs a number of operations upon the image-representing data which enters the pipeline, in preparation for the printing process. These operations may include, as known in the art, e.g. print data compression, print data decompression, color space conversion and halftoning. Halftoning may generate halftone dots with a number of levels to minimize printing artefacts. The types of print data which enter the pipeline may include text, line art, images and graphics.

FIG. 2a)-c) show schematic representations of print mask data as they are used according to an example. In general, multi-layer print mask data are produced which are schematically represented by matrices in FIG. 2. The multi-layer print mask data, as shown by the matrices, are generated by mapping the sub-images into different masking levels, wherein the masking levels represent an amount of ink drops fired in a printing cell at a given level, when producing the printout from the image-representing print data.

In the example which is described here with reference to FIG. 2, the generation of the multi-layer print mask data comprises mapping each sub-image separately into four different masking levels, e.g. image representing data of the line detail sub-image 20 are mapped to masking levels 0 and 1, and image representing data of the area detail sub-image 25 are mapped into levels 0, 2 and 3, wherein level 0 means that no drops are fired in the printing cells, one drop per printing cell are fired at levels 1 and 2, and two drops per printing cell are fired at level 3.

FIG. 2a) shows an example of a level 1 matrix which is used to print a line detail sub-image, as shown by reference numeral 20 in FIG. 1. As it is a level 1 matrix, one drop per printing cell is fired, and all printing cells are printed in a first print pass 1 of a number of e.g. N=8 print passes or layers, as assumed in the present example.

FIG. 2b) shows an example of a level 2 matrix which is used to print a sub-image with area fills or area details. In the present example, level 2 matrix means that one drop per printing cell is fired when printing the area detail sub-image. As represented by the different numerals in the level 2 matrix shown in FIG. 2b), the different printing cells are printed in different area detail print passes, distributed over N−1=8−1=7 print passes 2 . . . 8.

In a similar way, FIG. 2c) shows an example of a level 3 matrix which is used to print the area detail sub-image with area fills or area details. Level 3 matrix means that 2 drops per printing cell are fired when printing the area details. Also here, the different numerals associated with the individual printing cells represent the number of the print pass in which the respective printing cell is fired.

Separating the image into a line detail sub-image containing at least one of edge and line details, as line detail sub-image 20 of FIG. 1, and an area detail sub-image containing area details, as area detail sub-image 25 in FIG. 1, can be done by edge or line detector algorithms as they are, per se, well-known in the art, e.g. the well-known Canny's edge detector algorithm, which is appropriate for separating or splitting the image into the line detail sub-image and the area detail sub-image. Applied on the luminosity values of the input color image, this algorithm is very effective in detecting edges, i.e. lines, from any image. A description of the Canny's edge detector algorithm can be taken, e.g. from Canny, J., A Computational Approach to Edge Detection, IEEE Trans. Pattern Analysis and Machine Intelligence, 8(6), pp. 679-698, 1986, or R. Deriche, Using Canny's Criteria to Derive a Recursively Implemented Optimal Edge Detector, Int. J. Computer Vision, Vol. 1, pp. 167-187, April 1987, or from references and/or textbooks.

After having separated the original (input) image into the line detail sub-image, containing lines and edges of the image, and an area detail sub-image, containing area fills or details, it is now possible to apply different color pipelines or, more generally, printing mode processing pipelines to the sub-images so that lines and edges can be printed sharp and clear, and area fields or details show the best possible uniformity and color transitions.

In general, a first, i.e. at least one first, printing mode processing pipeline is performed on the line detail sub-image, and a second, i.e. at least one second, different printing mode processing pipeline is performed on the area detail sub-image. A color pipeline included in the first printing mode processing pipeline for the line detail sub-image can be set up in such a way that not only black lines can be enhanced with Hewlett Packard's well-known so-called "special-K pipeline" which avoids halftoning and increases K line, i.e. black line quality, but also color lines and edges can be optimized with such an algorithm. Optimization of color lines and edges can be done in different ways, per se well-known in the art, one efficient example is by using line-specific halftoning algorithms which improve line sharpness and color maps by increasing color ink densities so that lines and edges look sharper in the printout.

On the other hand, the second, different printing mode processing pipeline for the area detail sub-image, i.e. the sub-image containing area fills, can be set up so that area field uniformity is optimized and contouring in color transitions are minimized. Special halftoning algorithms, as they are well-known in the art per se, can be used to minimize coalescence on media, and color maps can be specifically applied to decrease contouring and, therefore, increase color transition smoothness.

Once each sub-image, i.e. the line detail sub-image and the area detail sub-image, has been subjected to the first and second printing mode processing pipelines, respectively, they are mapped into different masking levels. As described above in the example, the print mask data of the matrices shown in FIGS. 2a)-c) are of 2 bits per pixel, or in other words, there can be 4 masking levels. As exemplified, halftoning data from the image 20 containing lines and edges is mapped to masking levels 0 and 1, and halftoning data from the image 25 containing area fills or details is mapped into levels 0, 2 and 3. The number of ink drops fired in a printing cell at each level may be specified by a so-called drop sequence table, but, in the present example, it is assumed that for each printing cell no drops are fired at level 0, one drop per printing cell is fired at levels 1 and 2, and 2 drops per printing cell are fired at level 3. The printing cell size depends on halftoning resolution, a typical one is 1/600×1/600 inches, i.e. corresponding to 600 dpi.

In the example described above with reference to FIGS. 1 and 2, the printing of the image is performed in an 8 pass mode. In this case, the multi-layer or N-layer print mask data levels are set up as follows:

Level 1:

Data mapped to this level only contains lines and edges information. To minimize positioning errors of the ink drops relative to one another, and thus to increase line and edge sharpness, all lines would be printed, in the present example, in one single pass, in the present example in pass 1, as denoted by the numerals in the level 1 matrix shown in FIG. 2a), where the mask matrix of this level is filled with "1" for all printing cells (this, of course, does not mean that one drop is fired in every printing cell, but that, if the line detail sub-image includes image-representing data for a given printing cell, the same is printed by firing one drop per printing cell in the line detail print pass, in the present example).

Levels 2 and 3:

Data mapped to these levels contains area fills information, in the present example. As described above with reference to FIGS. 2b) and c), this data will be printed in passes from 2 to 8. The level 2 and 3 masks are designed to have ink drops of adjacent printing cells printed in different passes, i.e. with a time difference, in particular with a maximum possible time difference in the example shown. This is done to minimize grain due to coalescence that happens when firing ink drops in the same or in adjacent printing cells at the same time.

Figure 3:
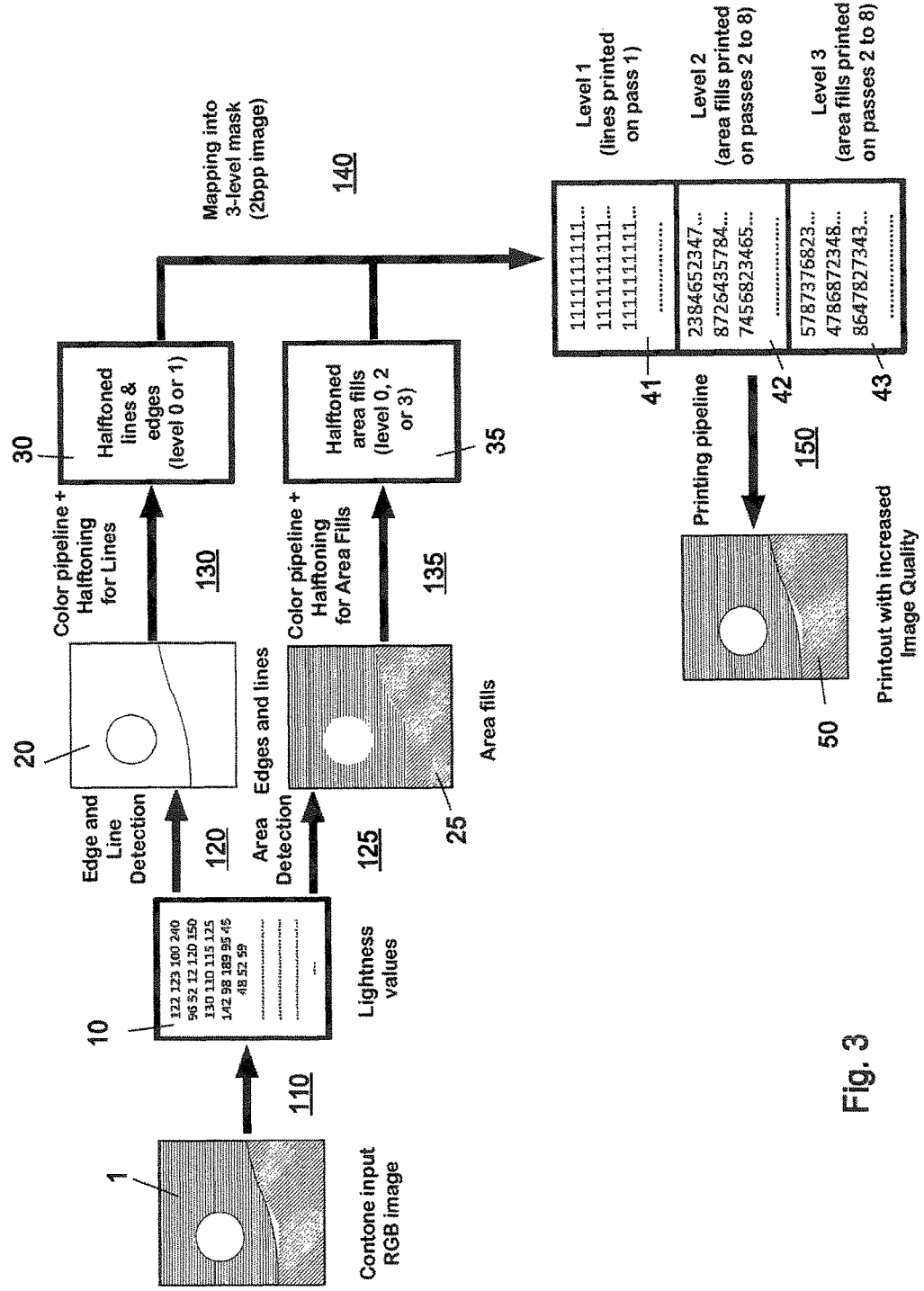
FIG. 3 is a schematic diagram showing processing of an image to be printed according to an example.

FIG. 3 is a schematic diagram which shows the processing of an image to be printed, according to an example. Reference numeral 1 denotes the input image of which a printout is to be produced by the printer. The input image can be, e.g. a contone RGB image. At 110, a representation of lightness or luminosity values of the contone input image 1 is generated, which is diagrammatically illustrated at reference numeral 10.

From the lightness or luminosity value representation 10 of the image, a line detail sub-image 20 which contains edge and line details is generated by edge and line detection 120, and an area fill or area detail sub-image 25 is generated by area detection 125. Edge and line detection 120 and area detection 125 is done by separating the image into the line detail sub-image 20 and the area detail sub-image 25 which can be done by a edge or line detector algorithm, as explained above.

The line detail sub-image 20 is subjected to a first printing-mode processing pipeline 130, especially a color pipeline and halftoning for lines, from which the result is a representation 30 of halftoned lines and edges of level 0 or 1, in the example as described above with reference to FIG. 2.

On the other hand, the area detail sub-image 25 is subjected to a second, different printing-mode processing pipeline 135, especially a color pipeline and halftoning for area fills, of which the result is a representation 35 of halftoned area fills of level 0, 2 or 3, in the example described above with reference to FIG. 2.

The representations 30 of the halftoned lines and edges and 35 of the halftoned area fills, then, at 140, are mapped into multi- or N-layer print mask data, in the example shown in FIG. 3 in 3-level mask matrices of 2 bits per pixel as shown by reference numerals 41, 42 and 43.

The level 1 matrix 41 which corresponds to the same one shown in FIG. 2a) is used, in the present example, to print a sub-image with lines and edges on pass 1, wherein according to the level 1, one drop per printing cell is fired. The level 2 matrix 42 which corresponds to the same one shown in FIG. 2b) is used to print a sub-image with area fills on passes 2 through 8, wherein in accordance with the level, being 2, one drop per printing cell is fired, and the level 3 matrix 43 which corresponds to the same one shown in FIG. 2c) is also used to print the sub-image with area fills on passes 2 through 8, wherein corresponding to the level, being 3, two drops are fired per printing cell. It is noted that no print mask data corresponding to level 0 are shown, neither for the halftoned lines and edges representation 30 nor for the halftoned area fills representation 35, because any level 0 print mask simply means that no drops are fired per printing cell, which, of course, can be omitted.

Then, at 150, the printing pipeline finishes by producing a printout 50 with increased image quality by printing the line detail sub-image 20, in the present example described, in a single line detail print pass from the level 1 matrix 41, and by printing the area fills or area detail sub-image 25 on print passes 2 through 8 using the level 2 matrix 42 and the level 3 matrix 43, respectively.

The result is a printout 50 with improved image quality which is superior as regards both line quality and area fills uniformity.

Aspects of the printer, the image processing method and the image processing unit are as follows:

N-layer print mask data may be generated, one print mask data layer being usable to print the line detail sub-image in one single line detail print pass, and the remaining N layers being used to print the area detail sub-image in N−1 area detail print passes.

Generation of the multi-layer print mask data may comprise mapping each sub-image into corresponding masking levels, the masking levels representing a number of ink drops fired in a printing cell at a given level when producing the printout from the image-representing print data.

Generation of the multi-layer print mask data may comprise mapping the line detail sub-image and the area detail sub-image into different masking levels.

Generation of the multi-layer print mask data may comprise mapping at least one sub-image separately into different masking levels.

Each sub-image may be mapped separately into four different masking levels, comprising mapping image-representing print data of the line detail sub-image to masking levels 0 and 1, and mapping image-representing print data of the area detail sub-image into levels 0, 2 and 3, wherein no drops per printing cell are fired at level 0, 1 drop per printing cell is fired at levels 1 and 2, and 2 drops per printing cell are fired at level 3.

Separation of the image into a line detail sub-image containing at least one of edge and line details, and an area detail sub-image containing area details may comprise a Canny's edge detection algorithm.

Generally, the processing unit may be implemented by e.g. a microprocessor, a Field Programmable Gate Array (FPGA), an Application Specific Integrated Circuitry (ASIC).

The processing unit may be part of a controller which is arranged for controlling the overall printer operation, or it may be a separate unit.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The present disclosure is industrially applicable to a printer, an image-processing method and an image-processing unit.

The invention claimed is:

1. A printer, comprising:
   a printing unit including a print media advance system and a print media advance driver arranged to produce a printout from image-representing print data of an image to be printed; and
   a processing unit including a processor coupled to a machine readable medium, the processing unit coupled to the printing unit and the medium containing instructions that when executed by the processor perform the tasks of:
   the print media advance driver; and
   processing image-representing input data of the image so as to generate the image-representing print data, including further instructions for:
      separating the image into a line detail sub-image containing edge and line details, and an area detail sub-image containing area details;
      performing a first printing mode processing pipeline on the line detail sub-image and performing a second, different printing mode processing pipeline on the area detail sub-image; and
      generating multi-layer print mask data by mapping each sub-image into multiple masking levels representing a number of drops fired in a printing cell at a given level when producing a printout from the image, wherein each sub-image is mapped separately into four different masking levels, comprising mapping the image-representing print data of the line detail sub-image to masking levels 0 and 1, and mapping image-representing print data of the area detail sub-image into levels 0, 2 and 3, wherein no drops per printing cell are fired at level 0, 1 drop per printing cell is fired at levels 1 and 2, and 2 drops per printing cell are fired at level 3, and wherein at least one print mask data layer is usable to print the line detail sub-image in at least one line detail print pass, and the remaining, at least one, of the print mask data layers usable to print the area detail sub-image in at least one area detail print pass.

2. The printer of claim 1, wherein N-layer print mask data are generated, one print mask data layer being usable to print the line detail sub-image in one single line detail print pass, and the remaining N layers being used to print the area detail sub-image in N−1 area detail print passes.

3. The printer of claim 1, wherein separating the image into a line detail sub-image containing edge and line details, and an area detail sub-image containing area details comprises a Canny's edge detection algorithm.

4. The printer of claim 1, wherein the printer is one type of printer from the group consisting of an inkjet printer, a liquid electrophotographic printer, and a wide format printer.

5. A printer, comprising:
   a processor; and
   a machine readable medium having instructions that when executed by the processor cause the processor to:
      provide a print media advance driver for detail print passes using a media advance system; and
      process image-representing input data of an image to be printed so as to generate image-representing print data, further including instructions to:
         separate the image into a line detail sub-image containing edge and line details, and an area detail sub-image containing area details;
         perform a first printing mode processing pipeline on the line detail sub-image and performing a second, different printing mode processing pipeline on the area detail sub-image; and
         generate multi-layer print mask data by mapping each sub-image separately into multiple different print mask data layers representing a number of drops fired in a printing cell at a given level when producing a printout from the image, wherein the image-representing print data of the line detail sub-image is mapped to masking levels 0 and 1, and the image-representing print data of the area detail sub-image into masking levels 0 and other than 1, and wherein no drops per printing cell are fired at level 0, and the number of drops for the other levels are specified in a drop sequence table, and wherein the mask data layer of level 1 is usable to print the line detail sub-image in one line detail print pass, and the remaining print mask data layers usable to print the area detail sub-image in area detail print passes.

6. The printer of claim 5, wherein N-layer print mask data are generated, one print mask data layer being usable to print the line detail sub-image in one single line detail print pass, and the remaining N layers being used to print the area detail sub-image in N−1 area detail print passes.

7. The printer of claim 5, wherein separating the image into a line detail sub-image containing edge and line details, and an area detail sub-image containing area details comprises a Canny's edge detection algorithm.

8. The printer unit of claim 5, wherein the printer is one type of printer from the group consisting of an inkjet printer, a liquid electrophotographic printer, and a wide format printer.

9. A method of processing an image to be printed on a printer having a processor coupled to machine readable medium including instructions to perform the method, comprising:

separating the image into a line detail sub-image containing edge and line details, and an area detail sub-image containing area details;

performing a first printing mode processing pipeline on the line detail sub-image and performing a second, different printing mode processing pipeline on the area detail sub-image; and generating multi-layer print mask data by separately mapping each sub-image into masking levels representing a number of drops fired in a printing cell at a given level when producing the printout from image-representing print data, wherein each sub-image is mapped separately by mapping the image-representing print data of the line detail sub-image to masking levels 0 and 1, and mapping image-representing print data of the area detail sub-image into levels 0, 2 and 3, wherein no drops per printing cell are fired at level 0, 1 drop per printing cell is fired at levels 1 and 2, and 2 drops per printing cell are fired at level 3, and wherein at least one print mask data layer is usable to print the line detail sub-image in at least one line detail print pass, and the remaining, at least one, of the print mask data layers usable to print the area detail sub-image in at least one area detail print pass.

10. The method of claim 9, wherein N-layer print mask data are generated, one print mask data layer being usable to print the line detail sub-image in one single line detail print pass, and the remaining N layers being used to print the area detail sub-image in N−1 area detail print passes.

11. The method of claim 9, wherein separating the image into a line detail sub-image containing at least one of edge and line details, and an area detail sub-image containing area details comprises a Canny's edge detection algorithm.

12. The method of claim 9, wherein the printer is one type of printer from the group consisting of an inkjet printer, a liquid electrophotographic printer, and a wide format printer.

* * * * *